United States Patent
Childs

(10) Patent No.: US 10,425,008 B2
(45) Date of Patent: *Sep. 24, 2019

(54) DRIVE SCHEME FOR WEAKLY COUPLED COILS

(71) Applicant: Apple Inc., Cupertino, CA (US)

(72) Inventor: Mark Childs, Swindon (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,384

(22) Filed: Jan. 29, 2018

(65) Prior Publication Data

US 2018/0152107 A1    May 31, 2018

Related U.S. Application Data

(62) Division of application No. 14/262,971, filed on Apr. 28, 2014, now Pat. No. 9,882,477.

(30) Foreign Application Priority Data

Apr. 16, 2014 (EP) .................................. 14392006

(51) Int. Cl.
    *H02M 3/158* (2006.01)
    *H02M 1/14* (2006.01)
    *H02M 3/156* (2006.01)

(52) U.S. Cl.
    CPC ............. *H02M 3/158* (2013.01); *H02M 1/14* (2013.01); *H02M 3/1584* (2013.01); *H02M 2003/1566* (2013.01); *H02M 2003/1586* (2013.01)

(58) Field of Classification Search
    CPC ................. H02M 3/155; H02M 3/156; H02M 2003/1566; H02M 2001/0029;
    (Continued)

(56) References Cited

U.S. PATENT DOCUMENTS 6,362,608 B1    3/2002 Ashburn et al.
6,670,794 B1    12/2003 Wang et al.
(Continued)

OTHER PUBLICATIONS

European Search Report, Application No. 14392006.4-1804, Applicant: Dialog Semiconductor GmbH, dated Nov. 21, 2014, 7 pgs.
(Continued)

*Primary Examiner* — Adolf D Berhane
*Assistant Examiner* — Shahzeb K Ahmad
(74) *Attorney, Agent, or Firm* — Meyertons, Hood, Kivlin, Kowert & Goetzel, P.C.

(57) ABSTRACT

A variable efficiency and response buck converter is achieved. The device includes a multi-phase switch, the coupled coils, the filter capacitor, and the load. The multi-phase switch includes the phase control inputs, the circuit common reference, at least two pairs of complementary switches with each switch containing one upper switch and one lower switch, at least two phase control outputs from the complementary switches. The coupled inductive coils are coupled to the phase control outputs to enable weak couplings and strong couplings. Based on the working mode, equivalently the coupled coils can provide strong mutual inductances and weak mutual inductances. The filter capacitors connected to the output of the coupled coils provide high efficiency output to the load.

9 Claims, 6 Drawing Sheets

(58) Field of Classification Search
CPC .... H02M 3/158; H02M 3/1584; H02M 3/335;
H02M 2001/0016; H02M 2003/1586
See application file for complete search history.

(56) References Cited

U.S. PATENT DOCUMENTS

| | | |
|---|---|---|
| 6,806,689 B2 | 10/2004 | Schuellein et al. |
| 7,034,511 B2 | 4/2006 | Schuellein et al. |
| 7,301,314 B2 | 11/2007 | Schuellein et al. |
| 7,449,867 B2 | 11/2008 | Wu et al. |
| 8,350,658 B1 | 1/2013 | Stratakos et al. |
| 9,806,523 B2 * | 10/2017 | Stratakos ................ H02J 3/383 |
| 2003/0214274 A1 * | 11/2003 | Lethellier ........... H02M 3/1584 323/272 |
| 2007/0176585 A1 | 8/2007 | He et al. |
| 2008/0019158 A1 | 1/2008 | Wu et al. |
| 2008/0169797 A1 | 7/2008 | Zambetti et al. |
| 2009/0001945 A1 | 1/2009 | Wickersham et al. |
| 2009/0066307 A1 * | 3/2009 | Osterhout ........... H02M 3/1584 323/283 |
| 2013/0093407 A1 | 4/2013 | Heo et al. |
| 2013/0307503 A1 | 11/2013 | Ouyang et al. |
| 2014/0266090 A1 * | 9/2014 | Wei ....................... H02M 3/156 323/271 |

OTHER PUBLICATIONS

"Interleaved Critical Current Mode Boost PFC Converter With Coupled Inductor," by Fei Yang, et al., IEEE Transactions on Power Electronics, vol. 26, No. 9, Sep. 2011, pp. 2404-2413.

* cited by examiner

DRIVE SCHEME FOR WEAKLY COUPLED COILS

This is a divisional application of U.S. patent application Ser. No. 14/262,971 filed on Apr. 28, 2014, which is herein incorporated by reference in its entirety, and assigned to a common assignee.

FIELD

The disclosure relates generally to variable buck converters, voltage regulators, and methods and, more particularly, to how to control the efficiency and the response of the buck converter and voltage regulators and a method thereof.

BACKGROUND

Buck converters are switching voltage regulators that operate in a step down method to provide a voltage output that is smaller than the input voltage. It accomplishes this by causing the circuit topology to change by virtue of turning on and off semiconductor devices. It uses signal switching to transfer energies into inductors. It uses a low pass filter scheme to eliminate high frequency harmonics to maintain a relatively constant output voltage and reduce the ripple of the output.

Typically buck converters use a feedback circuit to regulate the output voltage in the presence of load changes. They are more efficient at the cost of additional components and complexity.

Buck converters can be made very compact. Therefore they are popularly used for mobile devices, printed circuit boards, even in integrated circuit packages.

An example of a prior art buck converter circuit 600 is illustrated in a circuit schematic block diagram in FIG. 6a. The circuit 600 includes the a P type switch SW1 612, an N type switch SW2 614, an energy storage inductor L 630, the low pass filter capacitor $C_F$ 632, and the output load $R_L$ 634. The input voltage Vin 610 is the given high voltage. The output voltage Vout 636 is the converted voltage that is usually lower than Vin 610. The Vcom 640 is the common reference ground of the buck converter circuit 600. The control voltage $V_{GS1}$ 616 is coupled to the gate of the switch SW1 612 to control its on and off status. The control voltage $V_{GS2}$ 618 is coupled to the gate of the switch SW2 614 to control its on and off status.

The control voltage $V_{GS1}$ 616 and $V_{GS2}$ 618 are complementary to each other. It means that when $V_{GS1}$ 616 turns on the switch SW1 612, the $V_{GS2}$ 618 turns off the switch SW2 614. When $V_{GS1}$ 616 turns off the switch SW1 612, the $V_{GS2}$ 618 turns one the switch SW2 614. Hence, there are two working states for the buck converter in one working cycle.

One example of the working cycle is illustrated in FIG. 6b. During the time period $T_{s1}$ 662, the switch SW1 612 is turned on. Then the switch SW2 614 is turned off. The node voltage Vs 620 is equal to the input voltage Vin 610 since the SW1 612 is on with almost zero voltage drop. Then the buck converter storing the magnetic energy into the inductive coil charges inductor L 630. Then during the time period $T_{s2}$ 663, the switch SW1 612 is turned off. Base on the Lenz's law, the inductor L 630 will instantaneously maintain the current flowing through it. Therefor the loop current will go through the switch SW2 614 and turn it on. The node voltage Vs 620 is shorted to the common reference Vcom 640. The total working cycle is $T_{sw}$ 666. It is obvious that $T_{sw}=T_{s1}+T_{s2}$. The inductor and the capacitor form the low pass filter that filters out the high frequency harmonics reaches the output Vout 636. As a result, the output voltage Vout 636 is relatively constant with very small ripples.

If the ratio of $T_{s1}$ over $T_{sw}$ is defined as the duty cycle D, $D=T_{s1}/T_{sw}$. During the period $T_{s1}$ 662, the current through the inductor 630 L ramps up linearly. During the period $T_{s2}$ 664, the current through the inductor 630 L ramps down linearly. To make sure the ending current of the ramping down is equal to the starting current of the ramping up so that the buck converter 600 can maintain balance, the ratio of the output Vout 636 to the input voltage Vin 610 must be equal to the duty cycle:

$$Vout/Vin=D$$

The output voltage Vout 636 can be further controlled through feedback schemes. One popular method is the pulse width modulation (PWM) method. The PWM mode operates switches in synchronization with a clock that has a predetermined cycle. The magnetic energy stored in the inductor is repeatedly increased and decreased periodically. Hence, the power is transferred from the input Vin 610 to the output Vout 636. The output can be stabilized to a desired level by turning on and off the switch during synchronization with the clock. This mode is optimal for mid and high load current. However, it is not very efficient at lower load currents. Then if a buck converter 600 is to operate efficiently over a relatively wide range of load currents, including low load currents, the pulse frequency modulation (PFM) will be used.

The PFM is similar to PWM in the sense that the switch SW1 612 can be used to produce a series of inductor current pulses that are applied to the filter capacitor $C_F$ 632. However, the frequency of the pulses is not fixed. It varies in order to maintain a regulated output voltage between the upper regulated output voltage level and the lower regulated voltage level. At low load currents, PFM can provide increased efficiency as compared to PWM for the same current output. This is particularly true since the PWM operation has been optimized for efficient mid and high load current operation.

In view of the foregoing, buck converters have been designed to operate in a PWM mode for mid and high load currents and PFM for low load currents.

It is commonly known that a smaller inductor L 630 in the buck converter 600 give faster transient response, and the larger inductors give higher efficiency. High efficiency is important in all modes. But the link between the inductance of the inductor L 630 and the efficiency is particularly critical in the pulsed frequency modulation (PFM) mode. Fast load transient response on the other hand is most important in modes optimized for high load currents that can be handled by the pulse width modulation modes (PWM).

Inductors are just becoming available where several coils are embedded in the same package. These differ from those previously available in that their coupling ratio is much lower. Traditional multi-inductor packages were designed for use as transformers. Therefore they have a coupling ratio approaching 100%. However, with the new manufacturing techniques, multi-inductor packages are available where the coupling ratio is around 10%.

SUMMARY

If the buck converter is designed to make use of multi-inductor packages, driving the inductors with the correct architecture can bring benefits to both efficiency and load transient response.

It is known that small value inductors allow faster responses to the load current changes because the current variation rate dI/dt is proportional to L. Large value inductors are more efficient for a number of reasons. In PFM mode, the charge delivered to the output is fixed per cycle (for discontinuous mode). The energy wasted can also be assumed to be fixed per cycle. Anything that increases the charge delivered (without increasing the energy wasted) will increase the efficiency. A higher value inductor increases the charge delivered as it slows down the current ramp and increases the area under the current ramp curve.

It has been found that traditionally the load transient response (speed) and efficiency were mutually exclusive. The fast load transient response is achieved by the required small inductors. The higher efficiency is achieved by the large value inductors. The buck converter must compromise on one of the requirements. As will become clear in the following Description of the disclosure, using weakly coupled inductors, where they are in a single package, or simply deliberately coupled by their layout, the buck converter can make the most of both speed and efficiency simultaneously.

A principal object of the present disclosure is to provide a switch converter.

A further object of the present disclosure is to provide a variable efficiency and transient response voltage conversion circuit device Another further object of the present disclosure is to provide a method a method to tune the inductance of the mutually coupled inductor coils to provide a lower inductance for fast converter response or a higher inductance for suppression of current ripples.

In accordance with the objects of this disclosure, a switch converter is achieved. The device comprises a multi-phase switch having an input voltage, mutually coupled inductive coils connected to the multi-phase switch, wherein the switching converter is capable of tuning the inductance of the mutually coupled inductor coils to provide a lower inductance for fast converter response or a higher inductance for suppression of current ripple. The multi-phase switch is capable of receiving phase control signals and transferring them into phases needed for sync modes and sleep modes. It comprises at least two pairs of complementary signals as the input to multi-phase switches, at least two pairs of complementary switches receiving complementary signals as inputs to generate sync mode or sleep mode complementary phases, and at least one pair of phase signals generated as the output from complementary switches. The two pairs of complementary signals are capable of generating the sleep mode phase when they are in phases (0°) and the sync mode phase when they are out-of-phase (180°). The pair of output phase signals are instantiated in pairs, such as 0°, 90°, 180°, 270° for 4 pairs of complementary input signals. The mutually coupled inductive coil connected to output phase signals of multi-phase switches is capable of enabling both strong and weak couplings to optimize efficiencies and speed requirements of switches, the mutually coupled inductive coil further comprises 2 inductors with mutual couplings for 0° and 180° phases, or 4 inductors with mutual couplings for 0°, 90°, 180°, 270°, or multi-inductors with more phases. The mutually coupled inductive coil connected to output phase signals of multi-phase switches has the coupling ratio less than 100%. The mutually coupled inductive coil connected to output phase signals of multi-phase switches has the coupling ratio in between 5% and 30%. The mutually coupled inductive coil connected to output phase signals of multi-phase switches has a bigger inductance when the phase signal is in the sleep mode and a smaller inductance when the phase signal is in the sync mode. The coupled inductive coil connected to output phase signals of multi-phase switches in the sleep mode has 1% higher efficiency for low output currents. The coupled inductive coil connected to output phase signals of multi-phase switches in the sync mode has faster response for high output currents.

Also In accordance with the objects of this disclosure, a variable efficiency and transient response voltage conversion circuit device is achieved. The device comprises a converter control unit, an array of phase control circuit units controlled by the converter control unit, a multi-phase switch controlled by the array of phase control circuit units, a mutually coupled inductive coil at the output of the multi-phase switch, a plurality of capacitors and resistors circuits at the output of the coupled inductive coil; and an output monitor circuit connected to the output of the plurality of capacitors and resistors circuits and the input of the converter control unit. The converter control unit is capable of receiving control commands and transferring them into phase control signals needed for phase control circuits. The converter control unit further comprises circuit accepting control signals for efficiency and response specifications, and a regulation circuit accepting signals from the output monitor circuit. The array of phase control units connected to the control unit is capable of converting signals from outputs of the control unit to analog complementary control signals. Each phase control circuit unit further comprises a circuit accepting control signals from the converter control unit, and a conversion circuit with certain embedded algorithms to implement complementary phase control signals. The multi-phase switch controlled by the array of phase control circuit units is capable of creating an array of complementary phase signals that enables sleep modes, sync modes, or other multi-phase modes according to the number of input complementary phase control signals. A multi-phase switch further comprises at least two pairs of complementary signals as the input to multi-phase switches, at least two pairs of complementary switches receiving complementary signals as inputs to generate sync mode or sleep mode complementary phases, and at least one pair of phase signals generated as the output from complementary switches. The mutually coupled inductive coil connected to output phase signals of multi-phase switches is capable of enabling both strong and weak couplings to optimize efficiencies and speed requirements of switches. The mutually coupled inductive coil further comprises 2 inductors with mutual couplings for 0° and 180° phases, or 4 inductors with mutual couplings for 0°, 90°, 180°, 270°, or multi-inductors with more phases. The plurality of capacitors and resistors circuits at an output of the coupled inductive coil is capable of filtering out high frequency harmonics to deliver relatively constant voltages. A plurality of capacitors and resistors circuits further comprises a plurality of capacitors shunt in between the output and the common reference, a plurality of resistors shunt in between the output and the common reference, or a plurality of capacitors and resistors shunt in between the output and the common reference. The output monitor circuit connected to the output of the plurality of capacitors and resistors circuits and the input of the converter control unit is capable of detecting the load voltage or current and feed back the control signal into the control unit for the pulse frequency modulation (PFM) or the pulse width modulation (PWM). The output monitor circuit further comprises a high impedance receiving circuit to sample the load current or voltage, a signal conversion circuit with embedded algorithms to transfer the sampled load current or voltage into control signals, and an output driving circuit to port the generated port signal into the converter control unit to facilitate the pulse frequency modulation (PFM) or the pulse width modulation (PWM).

Also in accordance with the objects of this disclosure, a method for controlling inductance of a switch converter is achieved. The method comprises a multi-phase switch having an input voltage, mutually coupled inductive coils connected to the multi-phase switch; and tunes the inductance of the mutually coupled inductor coils to the provide a lower inductance for fast converter response or a higher inductance for suppression of current ripple. The multi-phase switch comprises complementary switches with complementary input voltages to generated output signals with various controlled phases. The mutually coupled inductive coils comprise weakly two or more coupled coils connected to the output of the multi-phase switches. The bigger effective inductances are obtained by controlling input phases of the coupled inductance coils to be in phase and bigger effective inductances are obtained by controlling input phases of the coupled inductance coils to be out-of-phase. The buck works in the "sleep mode" when the input phases of the coupled inductive coils are in phase and in the "sync mode" when the input phases of the coupled inductive coils are out of phase. The efficiency under the "sleep mode" is highest while the load response under the "sync mode" is the fastest. The efficiency under the "sync mode" does not matter much at large load current due to the weak coupling of the inductive coils. The method can be extended to other type of bucks such as boosts and buck-boosts.

As such, a novel variable efficiency and response buck converter with the controlled effective inductance from the coupled coils and a method to vary the efficiency and the response needed for the voltage conversion circuit through the weakly coupled coils are herein described. The circuit provides various efficiencies and response speed to the load. The efficiency is achieved with the larger effective inductance from the weakly coupled inductive coils. The faster response is achieved with the smaller effective inductance from the weakly coupled inductive coils. The device and method are applicable to a variety of switching converters, including buck converters, boost converters and buck-boost converters. The device and method are applicable to a variety of phase control schemes, the pulse frequency modulation (PFM), and the pulse width modulation (PWM) methods. The device and method are extensible to add more pairs of weakly coupled coils. The device and method are extensible to use strongly coupled coils. Other advantages will be recognized by those of ordinary skills in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DESCRIPTION

Figure 1:
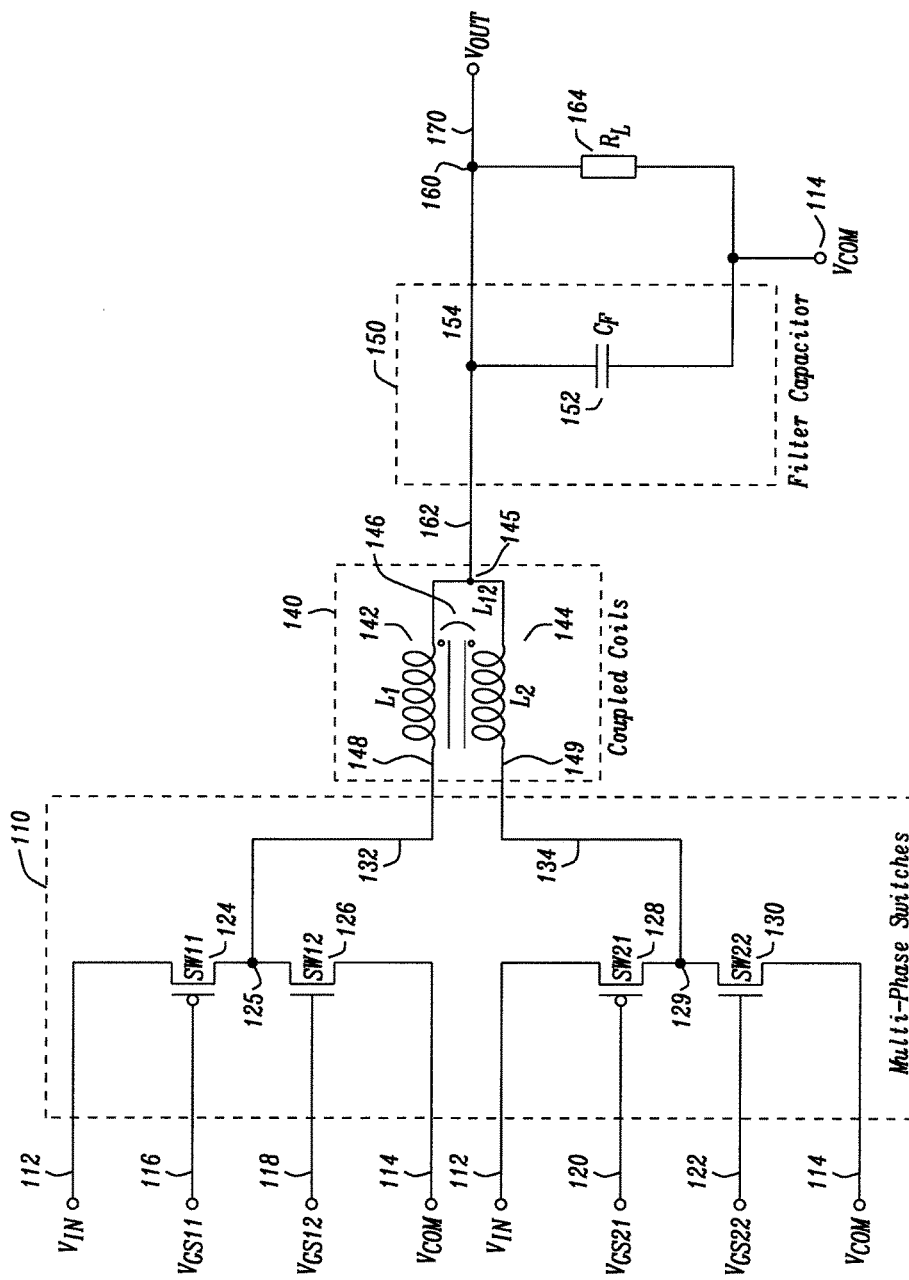
FIG. 1 is a circuit schematic diagram illustrating one example of a variable efficiency and transient response buck converter in accordance with one embodiment of the disclosure.

FIG. 1 is a circuit schematic diagram illustrating one example of a variable efficiency and response buck converter 100 in accordance with one embodiment of the disclosure. The device 100 includes a multi-phase switch 110, the coupled coils 140, the filter capacitor 150, and the load 164. The multi-phase switch 110 includes input Vin 112, the circuit common reference Vcom 114, the upper switch SW11 124, the low switch SW12 126, the upper switch SW21 128, the low switch SW22 130, the input $V_{GS11}$ 116, the input $V_{GS12}$ 118, the input $V_{GS21}$ 120, the input $V_{GS22}$ 122, the output 132 from the upper switch SW11 124 and the low switch SW12 126, and the output 134 from the upper switch SW21 128 and the low switch SW22 130. The coupled coils 140 includes inductor L1 142, the inductor L2 144, the mutual inductance L12 146, the input 148 to the inductor L1 142, the input 149 to the inductance L2 149, the output 162. The filter capacitor 150 includes the filter capacitor $C_F$ 152. The load is simply represented by the load resistor $R_L$ 164. The output of the buck converter is Vout 170.

In the multi-phase switches 110, the switch SW11 124 and SW12 126 form a pair and are preferably coupled at the node 125. The switches may be implemented in any available technology, such as MOS or bipolar or mixed technology. The input $V_{GS11}$ 116 is preferably coupled to the switch SW11 124. The input $V_{GS12}$ 118 is preferably coupled to the switch SW12 126. The output 132 is preferably coupled at the node 125 to both the upper switch SW11 124 and the low switch SW12 126. The switch SW21 128 and SW22 130 form a pair and are preferably coupled at the node 129. The switches may be implemented in any available technology, such as MOS or bipolar or mixed technology. The input $V_{GS21}$ 120 is preferably coupled to the switch SW21 128. The input $V_{GS22}$ 122 is preferably coupled to the switch SW22 130. The output 134 is preferably coupled at the node 129 to both the upper switch SW21 128 and the low switch SW22 130.

In the coupled coils 140, the input 148 is preferably coupled to the output 132 from the multi-phase switches 110, and the input 149 is preferably coupled to the output 134 from the multi-phase switches 110. The inductor L1 142 is preferably coupled to the inductor L2 144 at the node 145. The other end of inductor L1 142 is preferably coupled to the input 148. The other end of inductor L2 144 is preferably coupled to the input 149. The output 162 is preferably coupled to the coupled coils 140 at the node 145.

In the filter capacitor 150, one side of the filter capacitor $C_F$ 152 is coupled to the input 162. The other side of the filter capacitor $C_F$ 152 is coupled to the common reference ground Vcom 114. The output 154 of the filter capacitor 150 is coupled to one side of the load resistor $R_L$ 164 at the node 160. The output Vout 170 is preferably coupled to the load resistor $R_L$ 164 at the node 160.

While the embodiment illustrates one coupled coils with only two pairs of switches, it should be understood that multiple coupled coils with multiple pair of switches may be used in the present disclosure.

In the preferred embodiment, the input $V_{GS11}$ 116 and the input $V_{GS12}$ 118 are controlled by complementary pulsed signals. Thereby the switch SW11 124 has opposite on/off status relative to the SW12 126. The input $V_{GS21}$ 120 and the input $V_{GS22}$ 122 are controlled by complementary pulsed signals. Thereby the switch SW21 128 has opposite on/off status relative to the SW22 130. Because the symmetry of the circuit configuration in the multi-phase switches 110, the output 132 and 134 from the multi-phase switches 110 will have identical waveforms except the phase. The output 132 and 134 could be in-phase or out-of-phase. When the output 132 and 134 are in-phase, the buck converter 100 is working under the "sleep mode". When the output 132 and 134 are out-of-phase, the buck converter 100 is working under the "sync mode". The sleep mode is a mode for the low output currents and high efficiency. It is preferably for the pulse frequency modulation (PFM). The sync mode is a mode for the larger load transients. It is preferably for the pulse width modulation (PWM).

The inductor L1 142 and L2 144 form a pair of inductors. They have the mutual inductance L12 146. If the inductor L1 142 and L2 144 are weakly coupled, the mutual inductance L12 146 is small. The current in the inductor L1 142 will affect the value of the current in the inductor L2 144 if the mutual inductance L12 is not equal to zero. If the input 148 of the inductor L1 142 and the input 149 of the inductor L2 144 are in-phase, both inductors are operated in the same polarity. Hence, the current in the inductor L1 142 and the current in the inductor L2 144 will both ramp with the same polarity. The coils will interfere constructively. The current in the inductor L1 142 will act together with the current in the inductor L2 144, and vice versa. This constructive interference increases the effective inductance to the buck converter 100. As one example, if the two inductors are matched and coupled with 10% coupling ratio, the increase in the effective inductance is also 10%. If the input 148 of the inductor L1 142 and the input 149 of the inductor L2 144 are out-of-phase, both inductors are operated in the opposite polarity. Hence, the current in the inductor L1 142 and the current in the inductor L2 144 will ramp with the opposite polarity. The coils will interfere destructively. The current in the inductor L1 142 will act inversely with the current in the inductor L2 144, and vice versa. This destructive interference decreases the effective inductance to the buck converter 100.

In the proposed embodiment, the coupled coils can be implemented in the same IC package. With the new manufacturing techniques, the weakly coupled coils are available in package where the coupling ratio is around 5% to 30%. It is also understandable that the proposed embodiment does not have a limit to the coupling ratio. Hence, coupled coils made by other manufacturing techniques with strong inductive coupling are also included in the proposed embodiment.

In the proposed embodiment, the buck converter 100 has at least two pairs of switches in the multi-phase switches 110. The switches SW11 124 and the SW12 126 are one pair with the output 132. The switches SW21 128 and the SW22 130 are another pair with the output 134. The inductor L1 142 is controlled by the output 132. The inductor L2 144 is controlled by the output 134.

The buck converter 100 works in the "sleep mode" when the output 132 and 134 are in-phase. In this case, if the current in the inductor L1 142 ramps up, the current in the inductor L2 144 also ramps up. Hence, the coupled coils 140 appear to have larger effective buck converter inductance than the nominal inductance value of each individual inductor L1 142 and L2 144. Because the larger buck inductance results in higher efficiency, the "sleep mode" will show higher efficiency, especially for the low output currents in the PFM mode.

The buck converter 100 works in the "sync mode" when the output 132 and 134 are out-of-phase. In this case, if the current in the inductor L1 142 ramps up, the current in the inductor L2 144 ramps down. Hence, the coupled coils 140 appear to have a smaller effective buck converter inductance than the nominal inductance value of each individual inductor L1 142 and L2 144. Because a smaller buck inductance allows the output current to change more rapidly in the response to a load step, the buck converter 100 will have better load transient response, especially for the larger load transient in the PWM mode. The efficiency in this mode is not typically limited by the coil value. Hence, the decrease in the efficiency caused by the smaller inductance value is negligible.

Figure 3:
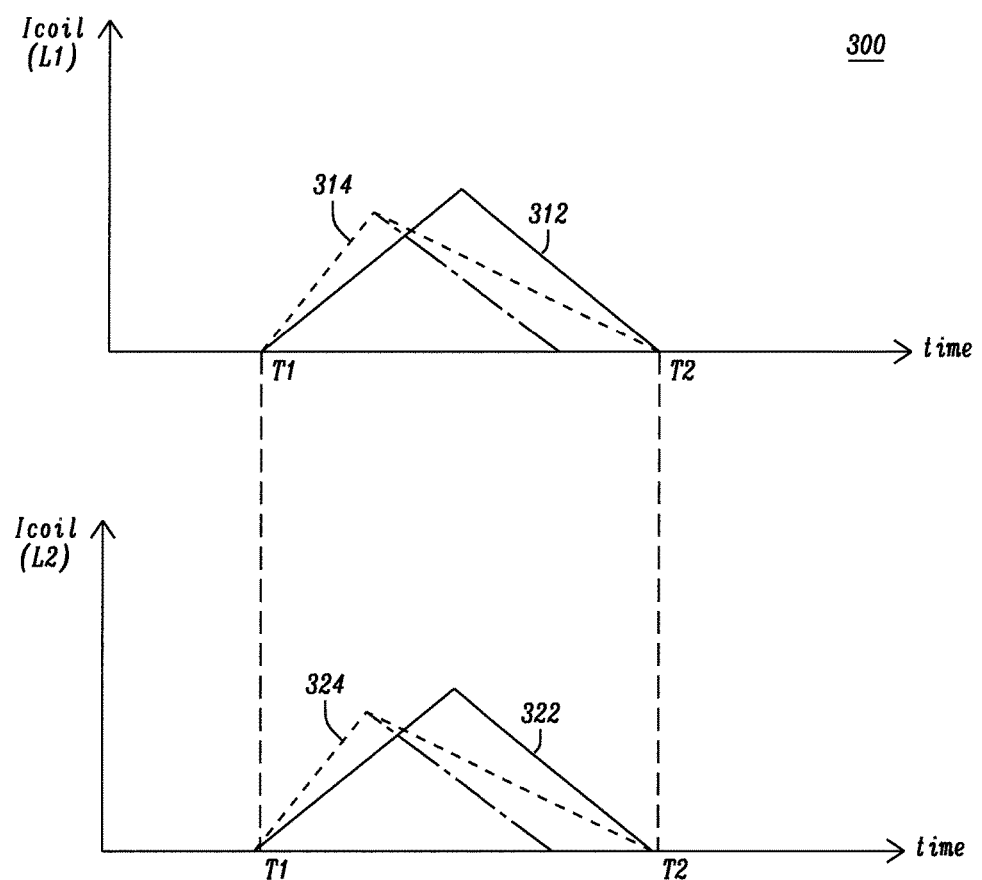
FIG. 3 is the signal diagram illustrating one example of the inductor coil currents in a variable efficiency and transient response buck converter using the in-phase "sleep mode" in accordance with one embodiment of the disclosure.

Referring now to FIG. 3, it is one example diagram of the currents in the inductor L1 142 and inductor L2 144 in the "sleep mode" where high efficiency is needed. In this mode, the current Icoil (L1) 312 in the inductor L1 142 is in-phase with the current Icoil (L2) 322 in the inductor L2 144. They ramp in phase. This increases the effective buck converter inductance. Hence, the current Icoil (L1) 312 under the in-phase coupling ramps slower than the current Icoil (L1) 314 that has no coupling. It is noted that the current Icoil (L1) 312 has greater area underneath it than the current Icoil (L1) 314. It implies that the energy delivered under the coupling case is higher than the energy delivered without the coupling. This justifies why the efficiency is higher in the "sleep mode".

Figure 4:
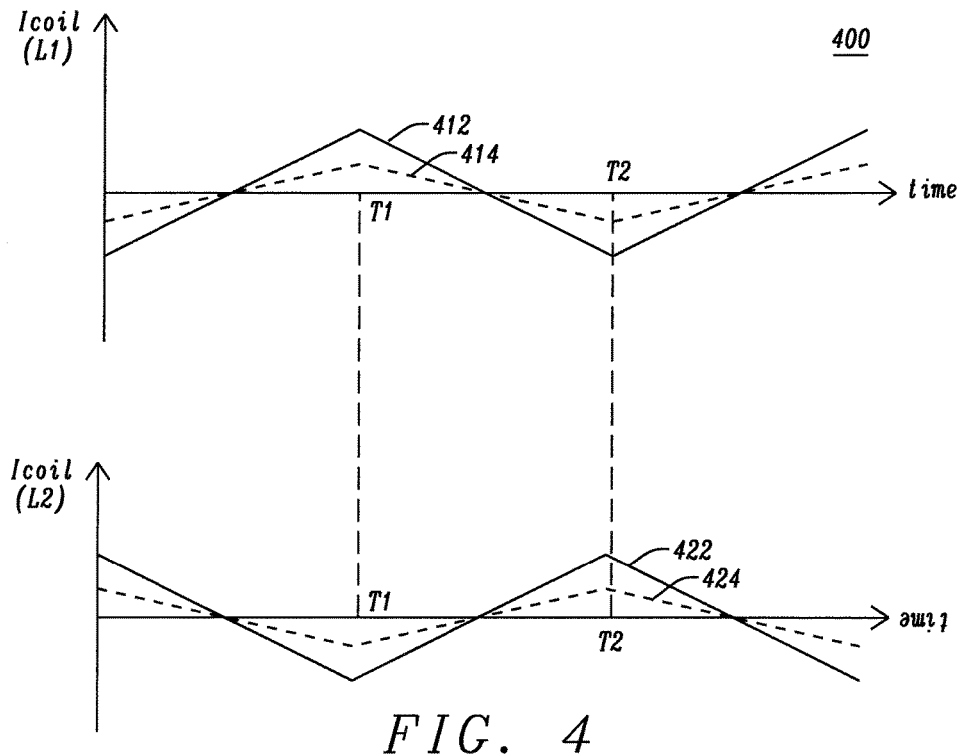
FIG. 4 is the signal diagram illustrating one example of the inductor coil currents in a variable efficiency and transient response buck converter using the out-of-phase "sync mode" in accordance with one embodiment of the disclosure.

Referring now to FIG. 4, it is one example diagram of the currents in the inductor L1 142 and inductor L2 144 in the "sync mode" where the larger transient response is needed. In this mode, the current Icoil (L1) 412 in the inductor L1 142 is out-of-phase with the current Icoil (L2) 422 in the inductor L2 144. Hence, they ramp out of phase. This decreases the effective buck converter inductance. Hence, the current Icoil (L1) 412 under the out-of-phase coupling ramps faster than the current Icoil (L1) 414 that has no coupling. It implies that the buck converter 100 under the coupling case responses faster to the load step than the case without the coupling. This justifies why better load transient response can be achieved in the "sync mode".

The proposed embodiment can be implemented in exactly the opposite way. The polarity of the coupled coils 140 can be reversed. As a result, the "sleep mode" will be invoked when the output 132 and 134 are out of phase while the "sync mode" will be invoked when the output 132 and 134 are in phase.

Figure 5:
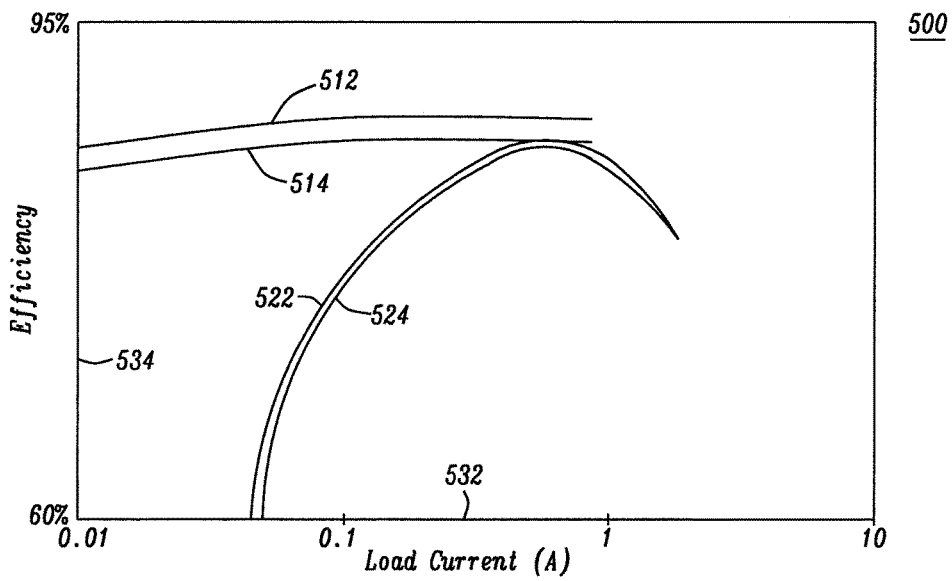
FIG. 5 is the efficiency diagram illustrating one example of a variable efficiency and transient response buck converter using the in-phase "sleep mode" and the out-of-phase "sync mode" in accordance with one embodiment of the disclosure.
Figure 6A:
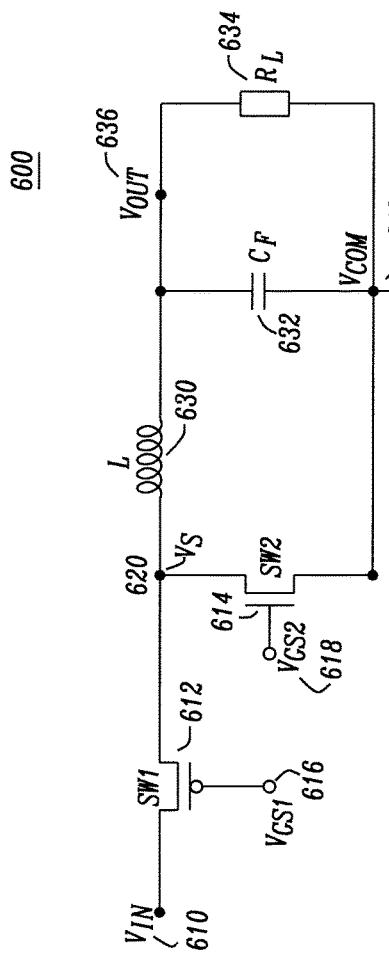
FIG. 6 is a circuit schematic block diagram illustrating a prior art, buck converter circuit.
Figure 6B:
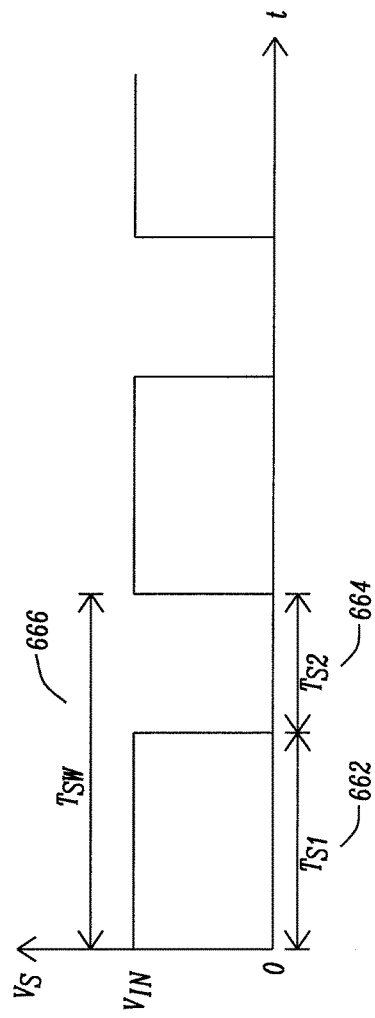

Referring now to FIG. 5, it shows one example of the calculated efficiency of the buck converter 100 from the proposed embodiment. The efficiency 512 vs. the load current shows the efficiency of the buck converter 100 when it is working in the "sleep mode" with the mutual inductance L12 146 equal to 1.2 uH. The efficiency 514 vs. the load current shows the efficiency of the buck converter 100 when it is working in the "sleep mode" with the mutual inductance L12 146 equal to 0.8 uH. The efficiency 522 vs. the load current shows the efficiency of the buck converter 100 when it is working in the "sync mode" with the mutual inductance L12 146 equal to 1.2 uH. The efficiency 524 vs. the load current shows the efficiency of the buck converter 100 when it is working in the "sync mode" with the mutual inductance L12 146 equal to 0.8 uH. The improvement of the efficiency in the "sleep mode" has 1% for the same load transient response. The decrease in "sync mode" efficiency is negligible for significant load currents. FIG. 5 has been verified both experimentally and in simulation. Hence, the proposed embodiment is confirmed to be effective.

Figure 7:
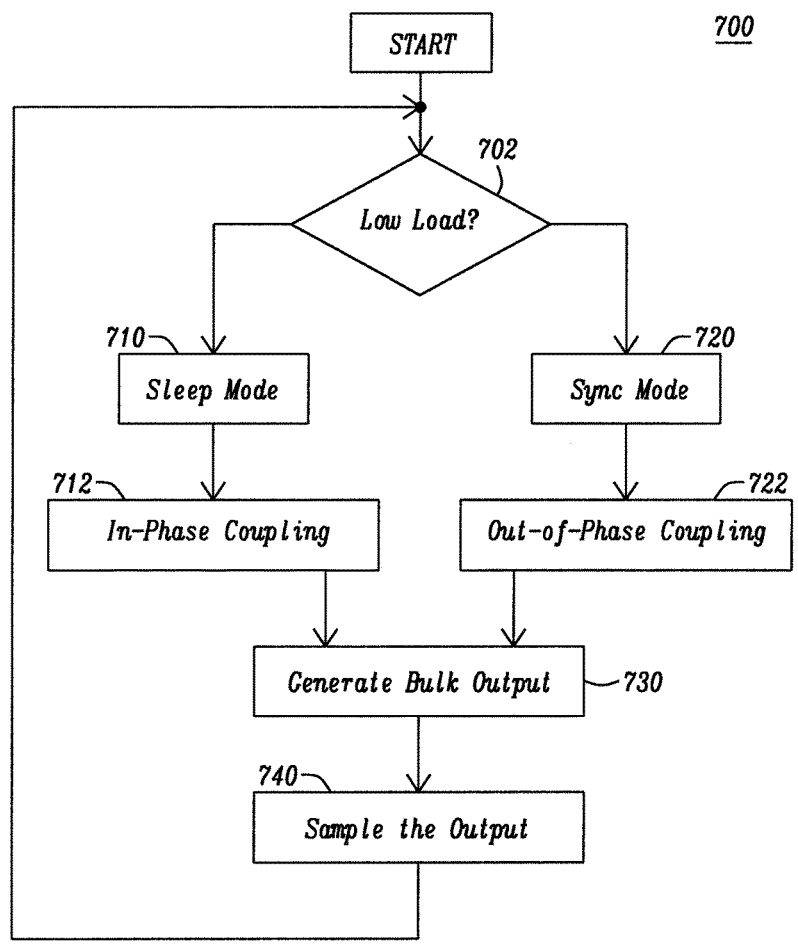
FIG. 7 is the flow chart illustrating the methodology of using weakly coupled inductive coils to tune both speed and efficiency simultaneously.

Referring now to FIG. 7, it shows the flowchart of the methodology of using the weakly coupled inductive coils to achieve both speed and efficiency from the proposed embodiment. It begins with the load level judgment 702. If the load is low, the sleep mode will be invoked through 710. Then the weakly coupled inductive coils 140 will be fed by the in-phase control signals. Large equivalent inductance will be achieved. Then the generate bulk output at 730 will have very good efficiency. If the load is high, the sync mode will be invoked through 720. Then the weakly coupled inductive coils 140 will be fed by the out-of-phase control signals. Less equivalent inductance will be achieved. Then the generate bulk output at 730 will have better response speed. At the output of the bulk 730, a sample of the output will be taken through 740. The sampled load information will be fed to the input of 702.

Referring now to FIG. 1, it shows one example when the multi-phase switches 110 contains only two pairs of complementary switches. One pair includes the switches SW11 124 and SW12 126. Another pair includes SW21 128 and SW22 130. However, the proposed embodiment can be extended to more pairs in the multi-phase switches 110. For example, there can be four pairs of complementary switches in the multi-phase switches 110. As a result, the buck converter 100 becomes a four-phase converter. In the PFM mode, the four phases are typically in phase (in the "sleep mode") to achieve the maximum efficiency. But in the "sync mode", the phases would typically be equally spaced with 0, 90, 180, and 270 degree delays. The phases would therefore be paired as 0, 90, 180, and 270 degree.

In the proposed embodiment, the coupled coils 140 can be extended to include more than one pair of coupled inductances L1 142 and L2 144. The drive scheme with different phases can be applied together with the combination of many pairs of coupled coils to adjustable efficiency and load transient response. It shall be able switch to achieve the maximum effective inductance for a high efficiency mode and or the fast response for the low output mode.

An alternative embodiment is to disable one phase. If a phase is disabled, then the output of the disabled phase may be set to go high-impedance. In this case the voltage on the secondary coil—the one on the disabled phase—may vary with the voltage on the primary coil. Thus the primary coil will act like a simple uncoupled inductor. For this embodiment, preferably, both phases through the one pair of coupled inductances L1 142 and L2 144 can be driven out-of-phase in the "sync mode" to minimize the effective capacitance. Then in the "sleep mode" the secondary phase can be disabled. Consequently the effective inductance will rise back to the nominal (uncoupled) value. This will increase the efficiency.

Figure 2:
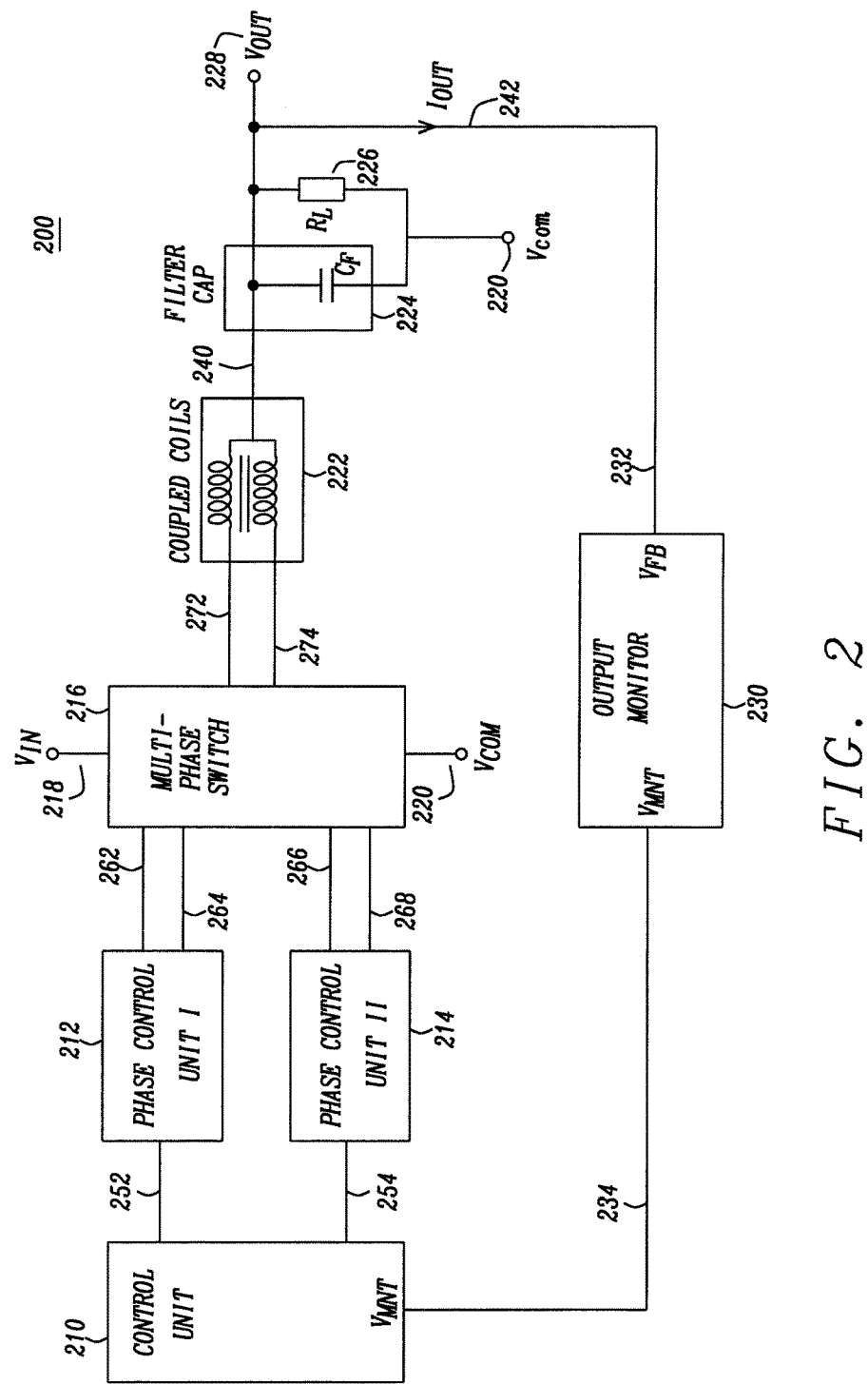
FIG. 2 is a circuit schematic diagram illustrating one example of a variable efficiency and transient response buck converter with the feedback circuit and the phase control system in accordance with one embodiment of the disclosure.

Referring now to FIG. 2, a circuit schematic diagram illustrate one example of the variable efficiency and response buck converter 200 using the control unit 210, the phase control units 212 and 214, and the output monitor 230 with one embodiment of the disclosure. The circuit 200 could be on a mobile device, such as a cellular phone, or on an integrated circuit chip, such as CPU. The system 200 includes a control unit 210, the phase control units 212 and 214, the output monitor 230, the multi-phase switches 216, the coupled coils 222, the filter cap 224, and the load resistor $R_L$ 226. The control unit 210 generates phase control signals 252 and 254 based on the pulse frequency modulation (PFM) or the pulse width modulation (PWM) need. The control unit 210 is also preferably coupled to the input $V_{MNT}$ 234 from the output monitor circuit 230. The output 252 and 254 from the control unit 210 are coupled to the two phase control units 212 and 214 respectively. The phase control unit I 212 generates complementary analog signals 262 and 264 coupled to the multi-phase switches 216. The phase control unit II 214 generates complementary analog signals 266 and 268 coupled to the multi-phase switches 216. The multi-phase switches 216 includes at least 2 pairs of complementary switches (the upper switch and the low switch). If there are only 2 pairs of complementary switches in the multi-phase switches 216, the phase output 272 and 274 are coupled to the input of the coupled coils 222. The coupled coils 222 includes at least a pair of weakly coupled inductive coils. The output 240 of the coupled coils 222 is preferably coupled to the filter capacitor 224. The filter capacitor 224 and the load resistor $R_L$ 226 are in parallel. The output voltage Vout 228 is coupled to the load resistor $R_L$ 226. The output voltage Vout 228 is preferably coupled to the input $V_{FB}$ 232 of the output monitor 230. The output monitor 230 monitors the output voltage Vout 228 or the load current Iout 242 and generates the control signal $V_{MNT}$ 234 coupled to the control unit 210.

In the embodiment, the control unit 210 contains the circuit for automatically switching between PWM and PFM modes based on the input $V_{MNT}$ 234 coupled from the output monitor 230. The output monitor 230 includes a reference generator to generate the reference signal for the error amplifier. The error amplifier generates the error signal between the feedback signal $V_{FB}$ 232 from the circuit output and the reference signal. The error signal is coupled to the control unit 210 to decide which of the PWM and PFM modes will be used.

The number of the coupled coils 222 can be more than one. Correspondingly the multi-phase switch 216 coupled to the inputs of the coupled coils can be more than one. The number of the multi-phase switch 216 will be equal to the number of the coupled coils 222. Consequently there will be more the phase control units 212 and 214. The number of the phase control unit is equal to the 2 times of the multi-phase switch 216.

As such, a novel variable efficiency and response buck converter with weakly coupled coils are herein described. The circuit uses the mutually coupled coils in a multi-phase switching converter to effectively achieve an electrically tunable inductance for energy storage, and to tune the inductance according to whether a low inductance is desired for the fast converter response, or a large inductance to suppress the current ripple.

The device and method are applicable to a variety of programmable buck converters and buck schemes. The device and method are extensible to add more pairs of coupled coils and more multi-phase switches. Other advantages will be recognized by those of ordinary skill in the art.

The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A variable efficiency and transient response voltage conversion circuit device, the device comprising:
    a converter control unit, configured to receive input from an output monitor circuit and to provide outputs to an array of multiple phase control units;
    said array of multiple phase control circuit units comprising at least two phase control circuit units, controlled by the converter control unit, wherein each phase control circuit unit is associated to a pair of complementary switches of a multiphase switch and is configured to control the associated pair of complementary switches of the multiphase switch;
    said multi-phase switch, wherein the multi-phase switch comprises at least two of said pairs of complementary switches, wherein each pair of complementary switches is configured to receive input signals from the associated phase control circuit unit and to control an associated coil of an arrangement of mutually weakly coupled inductive coils by phase signals, which are controlled by the array of phase control circuit units;
    said arrangement of one or more pairs of mutually weakly coupled inductive coils at the output of the multi-phase switch, wherein each coil is connected to an associated pair of complementary switches of the multi-phase switch;
    wherein each of said multiple phase control circuits units is configured to tune the inductance of the arrangement of mutually weakly coupled inductor coils to provide a lower inductance for fast converter response or a higher inductance for suppression of current ripple and is configured to operate said mutually weakly coupled coils out-of phase in pulse width modulation (PWM) mode and in-phase in pulse frequency modulation (PFM) mode;
    and
    an output monitor circuit connected between the output of the voltage conversion circuit device and the input of the converter control unit.

2. The device of claim 1 wherein the converter control unit is capable of receiving control commands and transferring them into phase control signals needed for the phase control circuit units, the converter control unit further comprising:
    a circuit accepting control signals for efficiency and response specifications;
    and a regulation circuit accepting signals from the output monitor circuit.

3. The device of claim 1 wherein the array of phase control circuit units connected to the control unit is capable of converting signals from an associated output of the control unit to analog complementary control signals, each phase control circuit unit further comprising:
    a circuit accepting control signals from the converter control unit;
    and a conversion circuit configured to implement complementary phase control signals.

4. The device of claim 1 wherein the multi-phase switch controlled by the array of phase control circuit units is capable of creating an array of complementary phase signals that enables sleep modes, sync modes, or other multi-phase modes according to the number of input complementary phase control signals, wherein the at least two pairs of complementary switches of the multi-phase switch are configured to receive inputs of at least two pairs of complementary signals to generate sync mode or sleep mode complementary phases via at least one pair of phase signals generated as the output from the at least two pairs of complementary switches.

5. The device of claim 1 wherein the mutually coupled inductive coil connected to output phase signals of multi-phase switches is capable of enabling both strong and weak couplings to optimize efficiencies and speed requirements of switches, the mutually coupled inductive coil further comprising:
    2 inductors with mutual couplings for 0° and 180° phases; or
    4 inductors with mutual couplings for 0°, 90°, 180°, 270°; or
    multi-inductors with more phases.

6. The device of claim 1 wherein the output monitor circuit connected to the output of the plurality of capacitors and resistors circuits and the input of the converter control unit is capable of detecting the load voltage or current and feedback the control signal into the control unit for the pulse frequency modulation (PFM) or the pulse width modulation (PWM), the output monitor circuit further comprising:
    a high impedance receiving circuit to sample the load current or voltage;
    a signal conversion circuit with embedded algorithms to transfer the sampled load current or voltage into control signals;
    and an output driving circuit to port the generated port signal into the converter control unit to facilitate the pulse frequency modulation (PFM) or the pulse width modulation (PWM).

7. The device of claim 1, wherein the inductance tuning of said arrangement of one or more pairs of mutually weakly coupled inductive coils is performed by phase delay control between switching times of the multi-phase switch and wherein each phase unit of the multi-phase switch is configured to receive phase control signals from said array of multiple phase control units and to transfer them into phases needed for sync modes or sleep modes; wherein said arrangement of mutually weakly coupled inductive coils connected to output phase signals of the multi-phase switches is configured to increase effective inductance of the weakly coupled inductive coils by operating the weakly inductive coils in a same polarity or to decrease effective inductance of the weakly coupled inductive coils by operating the weakly inductive coils in an opposite polarity.

8. The device of claim 7 wherein the coils of said pair of mutually weakly coupled inductive coils are connected with different polarity to said multi-phase switch.

9. The device of claim 1 wherein said arrangement of mutually weakly coupled inductive coils at the output of the multi-phase switch is a pair of mutually weakly coupled inductive coils.

* * * * *